G. DORCHEFF, ALIAS G. THEODORE.
CABBAGE CUTTER.
APPLICATION FILED OCT. 7, 1921.

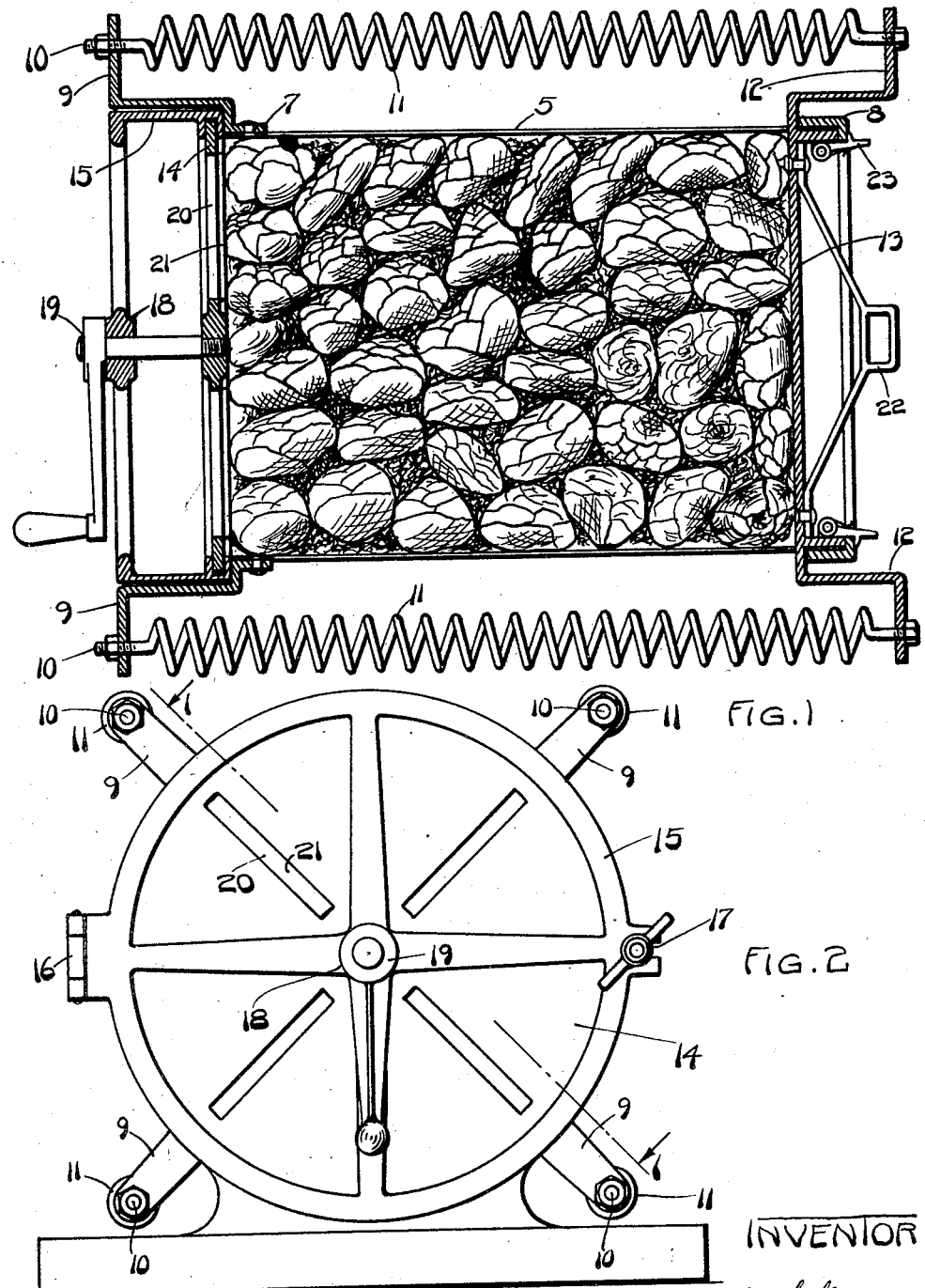

1,422,937.

Patented July 18, 1922.
2 SHEETS—SHEET 2.

INVENTOR
George Dorcheff
alias George Theodore

UNITED STATES PATENT OFFICE.

GEORGE DORCHEFF, ALIAS GEORGE THEODORE, OF CINCINNATI, OHIO.

CABBAGE CUTTER.

1,422,937.  Specification of Letters Patent.  Patented July 18, 1922.

Application filed October 7, 1921. Serial No. 506,042.

*To all whom it may concern:*

Be it known that I, GEORGE DORCHEFF, alias GEORGE THEODORE, a citizen of Macedonia, residing in Cincinnati, in the county of Hamilton and State of Ohio, have invented new and useful Improvements in a Cabbage Cutter, of which the following is a specification.

This invention relates to an improved device for the shredding of cabbage for the making of sour-kraut and the like, which may be driven by hand or by power and which has for an object to produce a machine by means of which the cutting of cabbage may be accomplished quickly and uniformly with no attendant wastage as a result of the operation.

A further object is to produce a cabbage cutter in which all corners for the collection of waste cabbage are eliminated and in which every part of the machine may be reached for thorough cleansing.

These and other objects are attained in the cabbage cutter described in the following specification and illustrated in the accompanying drawings in which:

Fig. 1 is a longitudinal sectional view taken on the line 1—1 of Fig. 2.

Fig. 2 is a front elevation of the machine shown in Fig. 1, showing the arrangement made for hand operation of the machine.

Figure 3:
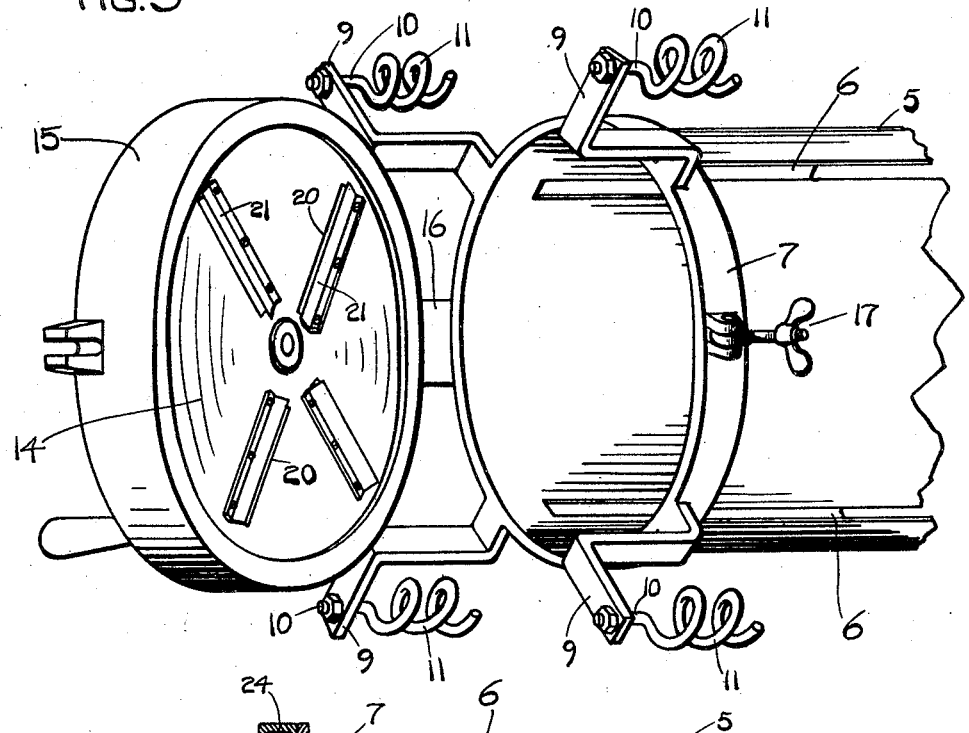
Fig. 3 is a fragmental perspective view showing the cutter disc to better advantage and showing the cabbage drum opened for the reception of cabbage to be shredded.

The machine I have illustrated as an embodiment of my invention consists of a cylindrical body 5, preferably of sheet metal, having slots 6 extending longitudinally thereof and having reenforcing bands 7 and 8 at its front and rear ends respectively. Band 7 is provided with a series of forwardly and upwardly extending arms 9 to which the forward ends 10 of a series of longitudinally extending tension springs 11 are attached, the rear ends of these springs being similarly mounted in backwardly and upwardly extending arms 12 which project through slots 6 of the body from a presser plate 13 located within the body for reciprocal motion therein.

At the forward end of the body a cutter disc 14 is located for rotation within a bearing housing 15 which is hinged at a point 16 for contact with the end of the drum or body, a catch 17 being provided for holding the housing against the body. A bearing 18 may be provided within the housing for support of a crank and crank shaft 19 by means of which the disc 14 is driven. Within the disc a series of slots 20 are provided for the passage therethrough of the shredded cabbage from a series of cutters 21 located back of the slots, the operation, when the disc is rotated, taking place much as a plane shaves wood. The pressure exerted by the plate 13 holds the cabbages against the cutter disc during its rotation.

When the body has to be refilled, it is but necessary to draw back the plate 13 against the tension of springs 11, by means of handle 22, until catches 23 engage the back of ring 8. This retains the plate until the body is filled, the housing 15 being swung upon its hinge 16 to afford access to the body. When the housing is closed the catches 23 may be released to allow the plate to press the cabbages against the cutter disc.

Figure 4:
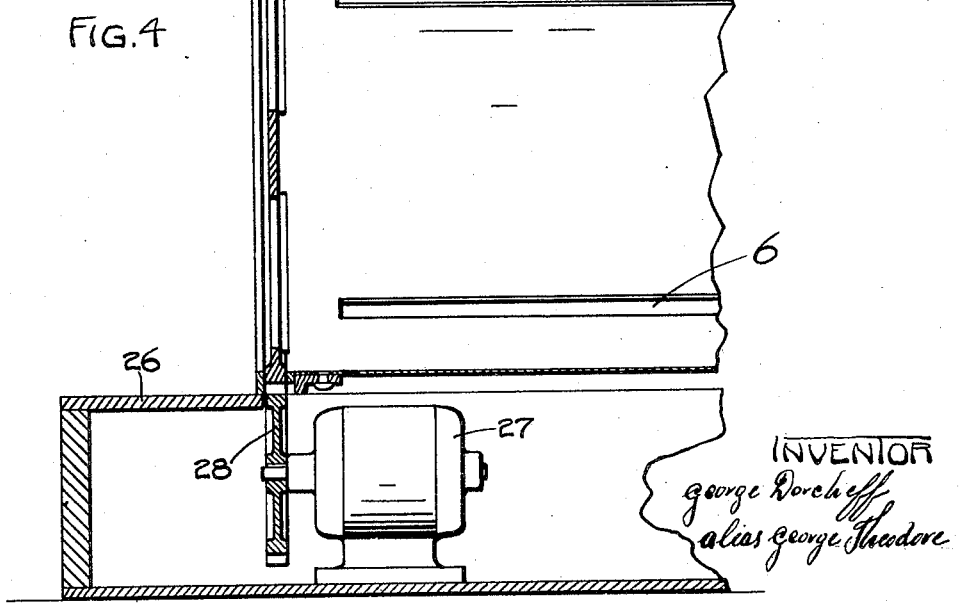
Fig. 4 is a fragmental sectional side elevation showing my improved machine arranged for power drive.

In Fig. 4 I have shown how the cutter disc may be driven by power. The edge of the disc is provided with teeth 24 which make the disc a gear. The bearing for this gear is rather novel, being the bearing which the ends of the teeth have in the materially shortened housing 25 which contains the gear. In the base 26 a motor 27 is mounted, this motor having a gear 28 which meshes with gear teeth 24 by providing a slot in the lower part of the housing 25 through which the teeth of gear 28 project.

Having thus described my invention what I claim is:—

A cabbage cutter comprising a cylindrical body, a reciprocally movable non-removable plate within and movable from one end of the body, adapted to be moved toward the opposite end of the body, a cutter plate housing hinged at the opposite end of the body, a removable cutter plate rotatively mounted within the housing and arranged to close the opposite end of the body when the housing is moved to contact the body, means for rotating the cutter plate from its housing enclosed rim, springs extending longitudinally and exteriorly of the body, attached to the first mentioned plate and adapted to move the plate longitudinally of the body, and catches adapted until released to retain the first mentioned plate at the first mentioned end of the body for purposes of filling.

In witness whereof, I affix my signature in the presence of two witnesses.

GEORGE DORCHEFF,
(Alias) GEORGE THEODORE.

Witnesses:
CHARLES W. POTTER,
W. J. SCHULTZ.